United States Patent
Greiter

(10) Patent No.: US 12,374,962 B2
(45) Date of Patent: Jul. 29, 2025

(54) MOTOR FOR A MOTOR VEHICLE HAVING AN OIL CIRCUIT FOR COOLING AND/OR LUBRICATION

(71) Applicant: AUDI AG, Ingolstadt (DE)

(72) Inventor: Ivo Greiter, Eitensheim (DE)

(73) Assignee: AUDI AG, Ingolstadt (DE)

(*) Notice: Subject to any disclaimer, the term of this patent is extended or adjusted under 35 U.S.C. 154(b) by 262 days.

(21) Appl. No.: 18/139,142

(22) Filed: Apr. 25, 2023

(65) Prior Publication Data
US 2023/0344312 A1   Oct. 26, 2023

(30) Foreign Application Priority Data
Apr. 26, 2022 (DE) ............... 10 2022 109 969.5

(51) Int. Cl.
*H02K 9/19*   (2006.01)
*H02K 7/00*   (2006.01)
*H02K 9/193*  (2006.01)

(52) U.S. Cl.
CPC ............ *H02K 9/193* (2013.01); *H02K 7/006* (2013.01)

(58) Field of Classification Search
CPC .............................. H02K 7/006; H02K 9/193
USPC ........................................................... 310/54
See application file for complete search history.

(56) References Cited

U.S. PATENT DOCUMENTS

| | | | |
|---|---|---|---|
| 5,509,381 A | 4/1996 | Fisher | |
| 6,218,795 B1* | 4/2001 | Syukuri | H02P 6/182 318/400.07 |
| 6,222,751 B1* | 4/2001 | Portaluri | H02M 7/53803 363/133 |
| 6,899,074 B1* | 5/2005 | Carlsson | F16H 57/0413 123/41.31 |
| 2001/0019249 A1* | 9/2001 | Kato | H02P 6/21 318/400.06 |
| 2006/0120903 A1* | 6/2006 | Iwasaki | F01P 7/048 417/423.1 |

(Continued)

FOREIGN PATENT DOCUMENTS

| CN | 113767553 A | 12/2021 |
|---|---|---|
| DE | 10 2010 051 041 A1 | 1/2012 |

(Continued)

OTHER PUBLICATIONS

Office Action, dated Mar. 6, 2023, for German Patent Application No. 10 2022 109 969.5 (6 pages).

*Primary Examiner* — Rashad H Johnson
(74) *Attorney, Agent, or Firm* — Seed IP Law Group LLP

(57) ABSTRACT

A motor for a motor vehicle is provided comprising an engine housing to contain an electric machine, wherein the electric machine and an oil collection tank of the motor or the motor vehicle are incorporated in an oil circuit or can be so incorporated, wherein oil for the cooling and/or lubricating of the electric machine circulates in the oil circuit by at least one delivery device, wherein the delivery device comprises a pump having at least two suction inlets or is such a pump, at least one such inlet being connected to at least one suction outlet of the engine housing and at least one other inlet is connected to at least one suction outlet of the oil collection tank, and the oil can be delivered by a common outlet of the pump at the pressure side to the oil collection tank and to the electric machine.

15 Claims, 3 Drawing Sheets

(56) References Cited

U.S. PATENT DOCUMENTS

| | | | | |
|---|---|---|---|---|
| 2007/0210733 | A1* | 9/2007 | Du | H02K 1/278 318/268 |
| 2009/0121664 | A1* | 5/2009 | Sugimoto | H02P 6/185 318/400.09 |
| 2010/0012074 | A1* | 1/2010 | Asaya | F01M 11/03 184/6.24 |
| 2012/0023939 | A1* | 2/2012 | Kley | F02B 39/08 60/624 |
| 2013/0343932 | A1* | 12/2013 | Stinessen | F04D 29/058 417/410.1 |
| 2014/0234124 | A1* | 8/2014 | Ruhle | F16H 57/0473 417/364 |
| 2016/0010520 | A1* | 1/2016 | Will | F01M 5/001 123/196 AB |
| 2018/0294693 | A1* | 10/2018 | Yu | H02K 9/19 |
| 2018/0363762 | A1* | 12/2018 | Kiyokami | F16H 57/0441 |
| 2019/0120369 | A1* | 4/2019 | Staake | F16H 57/045 |
| 2019/0229582 | A1* | 7/2019 | Ito | B60K 1/00 |
| 2020/0256222 | A1 | 8/2020 | Abu Mustafa | |
| 2022/0037953 | A1* | 2/2022 | Seidl | H02K 9/197 |
| 2023/0304572 | A1* | 9/2023 | Vanderlip | H02K 7/116 |
| 2023/0336062 | A1* | 10/2023 | Fahimi | H02K 29/00 |
| 2023/0344312 | A1* | 10/2023 | Greiter | H02K 7/006 |
| 2023/0396130 | A1* | 12/2023 | Liu | H02K 1/182 |
| 2024/0026968 | A1* | 1/2024 | Greiter | F16H 57/0457 |
| 2024/0271693 | A1* | 8/2024 | Gassmann | F16H 57/045 |
| 2024/0271694 | A1* | 8/2024 | Gassmann | F16H 57/0413 |
| 2024/0333104 | A1* | 10/2024 | Greiter | F16H 57/0476 |
| 2024/0339895 | A1* | 10/2024 | Krank | F16N 7/40 |
| 2024/0348128 | A1* | 10/2024 | Krank | H02K 9/197 |
| 2025/0031352 | A1* | 1/2025 | Zürn | H05K 7/20927 |
| 2025/0047169 | A1* | 2/2025 | Assaad | H02K 9/193 |
| 2025/0092872 | A1* | 3/2025 | Wiessmann | F04C 2/086 |

FOREIGN PATENT DOCUMENTS

| | | |
|---|---|---|
| DE | 10 2010 062 952 A1 | 6/2012 |
| DE | 10 2014 205 881 B3 | 6/2015 |
| DE | 10 2019 201 864 A1 | 8/2020 |
| JP | 2011-152814 A | 8/2011 |
| JP | 2020-061859 A | 4/2020 |

* cited by examiner

MOTOR FOR A MOTOR VEHICLE HAVING AN OIL CIRCUIT FOR COOLING AND/OR LUBRICATION

BACKGROUND

Technical Field

The present disclosure relates to a motor for a motor vehicle.

Description of the Related Art

In motors there exists a need to cool and/or lubricate components which become heated on account of movement and/or electric currents. In this regard, the concept of wet and dry sump lubrication is known.

In the case of wet sump lubrication, an oil sump is formed in an oil pan, closing off the housing at the bottom. The moving components dip into the oil sump, and oil is delivered by a pump from the oil sump to the corresponding lubrication sites.

In dry sump lubrication, on the other hand, components are not dipped into an oil sump, so that drag losses can be avoided. Instead, the oil collecting at the bottom in the housing is drained and delivered to a separate oil tank. From the oil tank, the oil is then delivered by a further pump to the lubrication sites. Although dry sump lubrication constitutes a more complex system than wet sump lubrication with not only one oil pump, benefits are obtained in terms of reliability of the lubricating action in highly slanting positions and/or under accelerations of the motor vehicle. Dry sump lubrication is often used in race cars or commercial machines for use in difficult terrain.

One concept regarding a lubrication system for a motor designed as a gear motor is known from the document JP 2020-61 859 A. The gear motor comprises an electric machine and a transmission, which are arranged in separate chambers divided from each other by a partition wall. Regarding the lubrication of the electric machine, oil is delivered from an oil sump formed in the transmission chamber to the engine chamber by a pump. Here, it flows back through an opening in the partition wall to the oil sump. For the lubrication of the transmission, the oil is delivered by a separate pump from the oil sump to an oil tank. From there, it flows downward to the transmission and back to the oil sump.

A further concept for an oil lubrication of a gear motor is known from the document DE 10 2014 205 881 B3. In this system, oil is pumped out from a transmission at the bottom and taken to a tank. From there, it is taken by a further pump to the transmission housing for the lubrication of the transmission.

JP 2011-152 814 A discloses a drive unit for a hybrid vehicle, comprising an engine and a transmission chamber, the chambers being separated from each other by a partition wall. Regarding the lubrication, oil is pumped out from the transmission chamber and taken on the one hand to the transmission and on the other hand to the electric motor. In order to equalize the oil levels in the chambers, a through opening is provided in the partition wall, along with a valve situated there, by which the clear passage can be opened and closed.

BRIEF SUMMARY

Embodiments of the present invention provide an improved concept for a lubrication and/or cooling of a motor, especially in terms of a more simple and/or space-saving design.

For example, embodiments provide a motor for a motor vehicle comprising an engine housing to contain an electric machine, wherein the electric machine and an oil collection tank of the motor or the motor vehicle are incorporated in an oil circuit or can be so incorporated, wherein oil for the cooling and/or lubricating of the electric machine circulates in the oil circuit by at least one delivery device.

In some embodiments, the delivery device comprises a pump having at least two suction inlets or is such a pump, at least one such inlet being connected to at least one suction outlet of the engine housing and at least one other inlet is connected to at least one suction outlet of the oil collection tank, and the oil can be delivered by a common outlet of the pump at the pressure side to the oil collection tank and to the electric machine.

In some embodiments, the motor thus realizes a dry sump lubrication, in which not only are the benefits typically obtained with a dry sump lubrication are obtained, but also the corresponding deficiencies as compared to wet sump lubrication, such as the greater system complexity, are avoided. Thus, instead of the usual two pumps provided during a wet sump lubrication, the delivery device is provided with only one pump.

Separate delivery volumes can be realized through the suction inlets of the pump for the delivery of at first separate and then combined oil volume flows, the oil volumes delivered by the pump from the suction outlets of the engine housing and the oil collection tank being brought together. The suction outlets can be openings emerging into oil lines connected to the delivery device. The pump comprises the outlet on the pressure side, by which the oil or the combined oil volume flows can be delivered, especially directly, to the oil collection tank and to the electric machine. Hence, the delivery device realizes a compound hydraulic and a single mechanical pump.

Regarding the oil collection tank, it is proposed that the oil not currently present in the other components of the circuit will collect there. Thus, the oil level currently present in the oil collection tank will depend on the current operating state of the motor or the oil circuit. The oil collection tank realizes an oil reservoir provided for buffering purposes.

The term "oil" shall mean any cooling and/or lubricating fluid by which a cooling and/or lubrication of the electric machine can be performed.

The housing can consist of metal and/or be in the shape of a pot or cylinder.

Using the electric machine, a traction torque can be generated for driving the motor vehicle. For this, the electric machine is connected to an electric energy accumulator or a storage battery of the motor vehicle. The drive torque generated by the electric machine is transferred by a drive train to the wheels of the motor vehicle, while the drive train may comprise shafts, differentials, and the like. In particular, the drive train comprises a transmission, to be further explained in detail below, which connects a drive shaft and a power takeoff shaft to each other. The transmission can accordingly be coupled at the engine side to the drive shaft, which in turn is coupled to the electric machine. The transmission can be coupled at the wheel side to the power takeoff shaft, by which the torque can be passed on to the wheels, and which is coupled, for example, to an axle differential. Using the transmission, such as a shiftable transmission, the gear ratio of the drive shaft and the power takeoff shaft is established.

In some embodiments, the pump comprises at least three suction inlets, at least two of which are connected to at least two suction outlets of the engine housing. The suction outlets of the engine housing can be arranged and/or configured such that always at least one of the suction outlets of the engine housing is covered with oil, even in a slanted position and/or under horizontal acceleration force of the motor vehicle, and therefore the oil can also be drained reliably from the engine housing in such situations. This may be of particular importance, since in the case of the electric machine a dipping of the rotor into oil, such as is deliberately done, for example, in the case of a transmission with wet sump lubrication, should be avoided. In one embodiment, the two suction outlets of the engine housing are situated at the bottom and on opposite sides of the engine housing.

Regarding the delivery device, it may comprise a vane pump, or is such a pump. The vane pump, also known as a rotary slide pump, consists of a hollow cylinder or stator and a cylinder or rotor rotating inside the stator. The rotor has radially running, such as slot like guides, in which rotary slides are arranged. These are freely movable along the guides in the radial direction and during the rotation of the rotor, they are pressed outward by centrifugal force as far as the inner wall of the hollow cylinder or stator, so that the space between the stator and rotor is divided into multiple chambers. The oil is delivered into these chambers by the rotary movement of the rotor and thus the co-rotating chambers.

One benefit of vane pumps is that, thanks to a form of the interior space of the stator differing from a circle, it can be divided into several separate delivery volumes, which in turn are each connected fluidically to one of the suction inlets. The separate or mutually separated delivery volumes can emerge into a common delivery volume of the vane pump, which in turn is fluidically connected to the outlet on the pressure side.

Insofar as the pump comprises two suction inlets, it can be a two-stroke vane pump. That is, the interior space of the stator, viewed in cross section, is oval or elliptical in shape, so that two separate delivery volumes are formed. Insofar as the pump comprises three suction inlets, it can be a three-stroke vane pump. The interior space of the stator can be triangular-oval, so that three delivery volumes are formed. "Triangular-oval" means that the interior space, viewed in cross section, can have the shape of a triangle, the corners of which and possibly also the sides, are rounded or curved. In event of more than three suction inlets of the pump or the vane pump, the interior space of the stator may be polygonal-oval in order to form further delivery volumes.

In some embodiments, the pump is adapted to generating different delivery volumes through different suction inlets, so that the oil can be delivered from the engine housing to the delivery device and from the oil collection tank to the delivery device with different pump performance. Thus, as regards to the engine housing, it is typically necessary to drain a sufficient quantity of oil from its interior space, since a dipping of components of the electric machine, especially the rotor, into an oil sump should be avoided. Thus, the delivery volumes of the individual pump stages of the pump can be designed such that, on the one hand, an adequate oil drainage from the engine housing and on the other hand an adequate oil supply from the oil collection tank to the oil circuit is assured. In the case of the vane pump, the different delivery volumes are realized by delivery volumes of different configurations, such as different sizes.

In the motor described herein, the pump and at least one component of the oil circuit, such as a throttle device and/or a valve device and/or an oil line, is adapted and/or designed such that the volume flow of the oil which can be delivered from the engine housing to the delivery device is greater than the volume flow of the oil which can be delivered from the delivery device to the engine housing. In other words, in this embodiment, the volume of the oil which can be drained from the engine housing is greater than the volume of the oil which can be supplied to the engine housing. This has the effect that it is assured, in every case, that no oil sump is created in the engine housing and, insofar as an oil sump should still arise, this will be appropriately reduced and ultimately pumped out completely. Corresponding throttle points may be designed such that the desired distribution of the oil volume flows is established.

In one embodiment, the pump and the component of the oil circuit are adapted and/or designed such that the difference between the volume flow of the oil delivered from the engine housing to the delivery device and the volume flow of the oil delivered from the delivery device to the engine housing can be compensated in that a volume flow of the oil corresponding to this difference can be supplied to the oil collection tank. In order to maintain the continuity equation, the volume of oil drained from the engine housing corresponds to the sum of the volumes of oil supplied to the engine housing and the oil collection tank.

Since the oil volume flow which can be drained from the engine housing is greater than the oil volume flow which can be supplied, it is conceivable, such as in cases where the motor vehicle is standing at an incline and/or large horizontal accelerations occur, that air can be taken in by the pump through at least one of the suction outlets of the engine housing. Since the air should be removed from the oil circuit, in the motor described herein, an oil line leading away from the pump comprises a venting device, for venting of air from the oil circuit. The venting device can be, for example, a diaphragm. The diaphragm is a small hole or a small opening provided in the oil line, which is small enough so that any air can flow out from it, but on the other hand, very little if any oil can emerge from the diaphragm on account of its viscosity.

The motor described herein can be configured as a gear motor. That is, the motor can be a structural unit comprising the electric motor or the electric machine and the aforementioned transmission, which is connected to the electric motor. In some embodiments, the motor or gear motor comprises a housing, containing the engine housing as an engine housing section for the electric machine and a transmission housing section for a transmission coupled to the electric machine. The transmission is or can be incorporated additionally in the oil circuit for cooling and/or lubrication by the oil.

In some embodiments, the interior space of the engine housing section and the interior space of the transmission housing section are separated from each other such that the oil collects separately in the engine housing section and the transmission housing section at respectively at least one suction outlet connected to the delivery device. Accordingly, the oil present in the engine housing section and the transmission housing section collects, fluidically separated from each other, and by virtue of gravity, in a lower portion of the respective housing section. Accordingly, the oil circuit branches at least at one point, the electric machine being incorporated in one of the branches and the transmission in the other branch. The oil in these two branches is pumped out separately from the engine housing section and the transmission housing section by the delivery device. The suction outlets are provided for the draining of the oil from the housing sections.

The fluidic separation of the oil during its collection or flowing together in the two housing sections provides great design freedom for the gear motor, especially since the oil cooling and lubricating the electric machine no longer needs to drain by gravity into the transmission housing section or be delivered there before it is pumped out by the delivery device. In particular, this allows for an extremely flat design of the gear motor.

The oil collection tank can be formed as a separate component. However, in other instances, a lower portion of the transmission housing section may form the oil collection tank, in which the oil collects. The oil collection tank in this embodiment is not a separate component, but instead it is integrated in an already present component of the gear motor, namely, the transmission housing section. The interior space of the transmission housing section is therefore utilized as efficiently as possible, so that an even more compact design is made possible in regard to the cooling and/or lubrication system or the motor. Since the oil present in the transmission housing section collects directly in the oil collection tank, no pump or the like is required to deliver the oil from the transmission housing section to the oil collection tank.

The transmission housing section and the oil collection tank can be configured such that the oil remains in the oil collection tank until reaching a maximum slanted position or horizontal acceleration for which the motor vehicle is designed and does not come into contact with a component of the transmission. The suction outlets can be positioned and/or configured such that they are still covered with oil in such an extreme state. Accordingly, the motor vehicle can be a race car or an offroad vehicle or a commercial machine designed for very steep slopes.

The transmission or at least one component of the transmission can be accommodated at least partly inside at least one shell which is open at the top on one side, so that the oil collection tank is bounded by an interior wall of the transmission housing section and the shell and is open at the top, emerging into the rest of the interior space of the transmission housing section. The shell can be fastened by at least one connection web to the inner wall of the transmission housing section. Welded, screwed, or other suitable connections are conceivable for this. By "shell" is meant any container open at one end, such as of a housing type, in which the transmission or a component of the transmission can be appropriately contained or arranged. In one simple instance, the shell can be a cuboid open on one side, i.e., it can comprise five side walls, while the missing sixth side wall represents the opening of the shell. The shell or the oil collection tank can be closed off fluid-tight at the bottom, so that the shell dips into the oil present in the oil collection tank. The shell or the oil collection tank of the transmission housing section may be fluidically passable, such that it has boreholes or openings provided specifically for this purpose, so that the oil taken up in the oil collection tank emerges from it to a slight degree in order to produce an emergency lubrication of the transmission.

Insofar as the component of the transmission which is contained in the shell is a gear, the shell can be adapted to its shape. Thus, the shell can have the shape of a cylinder situated in the transmission housing section, being cut off along a plane running parallel with its longitudinal axis, and this cut surface forms the top-side opening of the shell.

The shell provides many benefits. Thus, the oil present in the interior space of the transmission housing section typically forms an oil mist, so that the components of the transmission are wetted with oil. By force of gravity, the oil in the interior space of the transmission housing section drifts downward in the course of time, and a portion of the oil collects here on account of the specific configuration of the shell. A kind of "minimal" oil sump can form in the shell at the bottom side, but on account of the movement of the transmission component located there it is once more moved or thrown out from the shell. The surface of the "minimal" oil sump reaches as far as the moving component of the transmission. Another portion of the oil present in the interior space of the transmission housing section collects at the bottom in the transmission housing section or next to the shell or, in other words, in the oil collection tank.

The oil can be brought by at least one spray ring into the interior space of the engine housing section. The oil supply line can emerge into the spray ring which is situated or secured in the interior space of the engine housing section, such as extending entirely along the circumferential direction of the electric machine and having openings distributed along this circumference, through which the oil is brought into the interior space of the engine housing section. In addition or alternatively, the oil can be brought by a delivery lance into a rotor of the electric machine to form a rotor internal cooling. The delivery lance can extend along an axis of rotation of the rotor and be introduced into the rotor through the front end of the hollow rotor, whereupon the oil can be brought into the rotor interior space from a nozzle-like end of the delivery lance.

A heat exchanger may be incorporated in the cooling circuit for control of the temperature of the oil. The heat exchanger can be incorporated in a cooling circuit of the motor vehicle, in which a cooling fluid circulates, such as water, a mixture of water/glycol, or the like. Thus, heat can be transferred by the heat exchanger from the oil circuit to the cooling circuit, so that the cooling effect of the oil circuit is intensified.

The engine housing section may comprise a cooling water jacket, which is or can be incorporated in a cooling water circuit. The cooling water circuit can be a separate circuit or the cooling circuit in which the heat exchanger is also incorporated. The engine housing section in this embodiment comprises a housing wall forming or comprising the cooling water jacket. The cooling water jacket can be formed by cooling ducts running through the housing wall or by a cooling plate in thermal contact with the housing wall.

In order to prevent solids in the oil circuit, at least one oil screen or filter can be incorporated in it, by which particles such as abraded material from the transmission can be held back.

Besides the motor, embodiments of the present disclosure relate to a motor vehicle comprising a motor described herein. All benefits and features explained in the context of the motor described herein can be applied equally to the motor vehicle described herein and vice versa.

Regarding the delivery device, this is a component of the motor itself. Alternatively, the delivery device can be a component of the motor vehicle, in which case the motor will have corresponding connection interfaces by which it can be connected to the delivery device. Oil line flanges may be the interfaces. In some embodiments, a portion of the oil circuit extends in the region of the motor and another portion in the region of the motor vehicle.

BRIEF DESCRIPTION OF THE SEVERAL
VIEWS OF THE DRAWINGS

Further benefits and details of the disclosure will emerge with the aid of the following explained embodiments as well as the figures.

DETAILED DESCRIPTION

Figure 1:
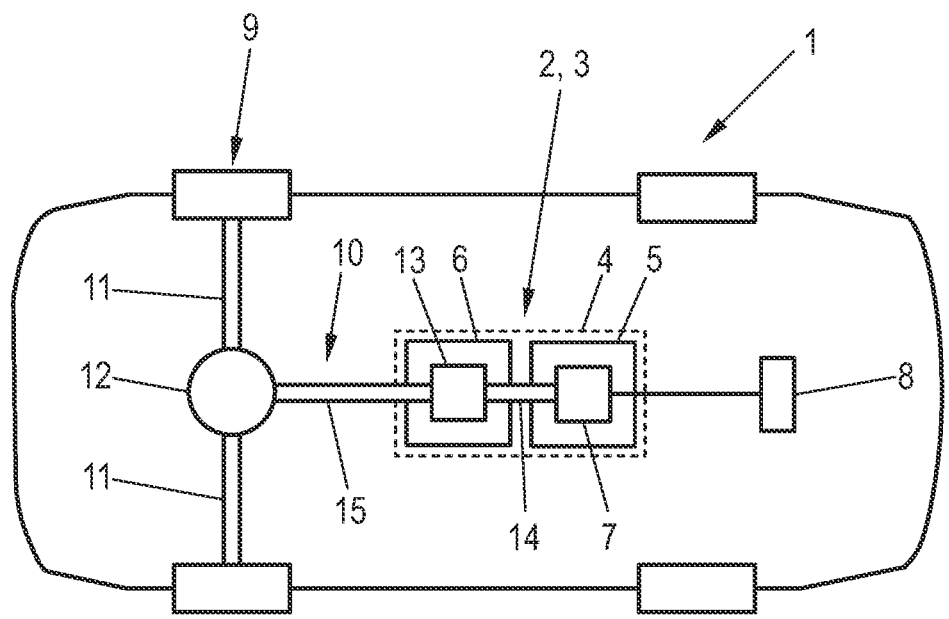
FIG. 1 shows an embodiment of a motor vehicle comprising a motor.

FIG. 1 shows an embodiment of a motor vehicle 1, comprising a motor 2 configured as a gear motor 3. The motor 2 or gear motor 3 comprises a multipiece housing 4, indicated in FIG. 1 by the dotted line. The housing 4 has an engine housing section 5, also called the engine housing 5 in the following, and a transmission housing section 6. In the engine housing section 5 there is arranged an electric machine 7, which is connected to an electric energy accumulator 8 of the motor vehicle 1, designed as an electric vehicle, and being adapted and designed to generate a drive power or a corresponding drive torque to propel the motor vehicle 1.

A drive train 10 is provided to transfer the drive torque from the electric machine 7 to a rear axle 9 of the motor vehicle 1. The drive train 10 comprises axle shafts 11 and a differential 12, by which the drive torque can be divided proportionately and transferred to the two axle shafts 11 and the wheels of the rear axle 9 connected to them. The drive train 10 moreover comprises a shiftable transmission 13, arranged in the transmission housing section 6, which is connected at the motor side by a drive shaft 14 to the electric machine 7 and at the wheel side to a power takeoff shaft 15, coupled to the differential 12. The rotary speed is apportioned between the shafts 14, 15 by the transmission 13.

In reference to FIG. 2, an embodiment of the motor 2 of the motor vehicle 1 will be explained.

Regarding the housing 4, the engine housing section 5 and the transmission housing section 6 are each cylindrical in shape and fastened to each other at the end face. For better clarity, neither the drive shaft 14 nor the power takeoff shaft 15 are shown in FIG. 2. However, a rotor shaft 16 of the electric machine 7 connected to the drive shaft 14 is shown. The electric machine 7, configured as an internal rotor, also comprises a rotor 18 coupled to the rotor shaft 16 and a stator 17. The transmission 13 is symbolized schematically in FIG. 2 as a gear.

For the cooling and lubricating of the electric machine 7 and the transmission 13 there is provided an oil circuit 19, in which the engine housing section 5 and the transmission housing section 6 are appropriately incorporated, along with an oil collection tank 20. Oil 21 circulates in the oil circuit 19, being delivered or pumped for this purpose by a delivery device 27.

Regarding the oil collection tank 20, it is formed from a bottom portion of the transmission housing section 6, in which the oil 21 collects by virtue of gravity. The transmission 13 or components of the transmission 13 are partly received inside a shell 22, open at the top. The oil collection tank 20 is bounded by the lower interior wall of the transmission housing section 6 and the shell 22. The oil collection tank 20 is open at the top and emerges into the rest of the interior space of the transmission housing section 6. The shell 22 is fastened by a not otherwise shown connection web to the interior wall of the transmission housing section 6. Depending on the present operating state of the motor vehicle 1 or the gear motor 3, different fill levels 23 of the oil 21 in the oil collection tank 20 will occur. The shell 22 is either fluid-tight or fluid-permeable, such as by virtue of specifically produced boreholes or openings of the shell 22, such that the oil 21 contained in the shell 22 emerges into the portion of the transmission housing section 6 where the transmission 13 is located, in order to perform an emergency lubrication of the transmission 13.

Regarding the housing sections 5, 6, the engine housing section 5 comprises a first suction outlet 24 and a second suction outlet 25 and the transmission housing section 6 comprises a suction outlet 26 for the draining of the oil 21 from the housing 4. The suction outlet 26 likewise constitutes a suction outlet 26 for the oil collection tank 20.

The oil 21 present in the engine housing section 5 and that present in the transmission housing section 6 for the cooling and/or lubrication of the electric machine 7 and the transmission 13 collects by virtue of gravity separately in the respective housing section 5, 6 at the suction outlets 24-26. Specifically, the oil 21 collects in the engine housing section 5 at least at one of the suction outlets 24, 25 and in the transmission housing section 6 at the suction outlet 26, forming a corresponding oil sump at the corresponding suction outlets 24-26, although this does not make contact with the components of the electric machine 7 and the transmission 13, so that the oil circuit 12 does not create a wet, but instead a dry sump lubrication.

Regarding the suction outlets 24, 25 of the engine housing section 5, these are arranged at the bottom and on opposite sides of the engine housing section 5. This ensures that at least one of the suction outlets 24, 25 is covered with oil 21, regardless of the present slanted positioning of the motor vehicle 1 and/or the present horizontal, i.e., longitudinal and/or transverse acceleration, so that the drainage of the oil 21 from the engine housing section 5 through the suction outlets 24, 25 is also ensured in such situations.

The delivery device 27 is provided for the delivery or circulation of the oil 21. The oil 21 is delivered from the oil collection tank 20 via the delivery device 27 and an oil supply line 28, which has a filtering or screening device 29, to the engine housing section 5 and to the transmission housing section 6. A heat exchanger 30 is incorporated in the oil supply line 28, by which heat is transferred from the oil circuit 19 to a cooling circuit 31, in which a water and glycol mixture is circulating, for example.

After the filtering or screening device 29 and the heat exchanger 30, the oil circuit 19 branches, so that a portion of the oil 21 carried in the oil supply line 28 is taken to the electric machine 7 and another portion to the transmission 13.

Regarding the branch going to the engine housing section 5, the oil 21 can be supplied to the electric machine 7 by two spray rings 32 and by a delivery lance 33. The spray rings 32 extend along the circumferential direction in the interior space of the engine housing section 5 and have outlet openings distributed along the circumferential direction, through which the oil 21 is introduced into the interior space of the engine housing section 5. The delivery lance 33 extends along the axis of rotation of the hollow rotor shaft 16 and is sprayed into this in order to form a rotor internal cooling. The oil 21 is taken by centrifugal force from the interior space of the rotor shaft 16 through openings of the shaft into the interior space of the engine housing section 5. The corresponding oil supply route is indicated by arrows in FIG. 2.

Because the electric machine 7 requires a more intense cooling than the transmission 13, on account of the electric currents there, a cooling water jacket 34 of the engine housing section 5 is provided for additional cooling. The cooling water jacket 34 is incorporated in a cooling water circuit 35, in which water circulates as the coolant. The cooling water circuit 35 can be the cooling water circuit 31.

Regarding the branch going to the transmission housing section 6, the oil 21 can be supplied to the transmission 13 through a spray nozzle 42. The oil 21 is present in the transmission housing section 6 as an oil mist wetting the components of the transmission 13, which settles to the bottom by force of gravity, namely, partly in the shell 22 and partly in the oil collection tank 20. Insofar as the oil 21 collects in the shell 22, it is taken up by the moving components of the transmission 13 located there and thrown back into the interior space of the transmission housing section 6.

The delivery device 27 is designed as a pump 36, or comprises such a pump, realizing a hydraulically triple and a mechanically single pumping device. The delivery device 27 or pump 36 is a common structural unit, indicated by the dashed box in FIG. 2. The pump 36 comprises three suction inlets 37-39, where the first suction inlet 37 is connected to the first suction outlet 24 and the second suction inlet 38 to the second suction outlet 25 of the engine housing section 5. The third suction inlet 39 is connected to the suction outlet 26 of the oil collection tank 20.

The pump 36 comprises a common outlet 40 on the pressure side, by which the oil 21 can be delivered directly to the oil collection tank 20 or its inlet 43 and to the electric machine 7 and the transmission 13. At the pressure side, the oil line coming from the common pump 36 branches on the one hand across a diaphragm 41 to the oil collection tank 20 and on the other hand to the electric machine 7 and the transmission 13. The diaphragm 41 is a small opening in the oil line, so that any air can flow out from the oil circuit 19 at this point. The diaphragm 41 is small enough that very little if any oil 21 can emerge from it on account of its viscosity.

The circulation path of the oil 21 circulating in the oil circuit 19 shall be described next. Starting from the delivery device 27, the oil 21 goes directly to a pump branching point 44, where the oil flow divides into the oil supply line 28 and a flow going to the oil collection tank 20.

Regarding the oil 21 delivered from the pump branching point 44 to the oil collection tank 20, this passes at first through the already explained diaphragm 41 and then goes through the inlet 43 to the oil collection tank 20.

Starting from the pump branching point 44, the rest of the oil 21 not delivered to the oil collection tank 20 is taken to a branching point 45 of the oil supply line 28. In the oil supply line 28, the oil 21 passes through the heat exchanger 30 and the following filtering or screening device 29. At the branching point 45, the oil flow divides into a transmission branch and an engine branch.

In the transmission branch, the oil 21 is introduced by the spray nozzle 42 into the transmission housing section 6 and thus supplied to the transmission 13. The oil 21 forms there an oil mist, which wets the components of the transmission 13. By force of gravity, the oil 21 or the oil mist drifts downward in the transmission housing section 6 and lands either in the oil collection tank 20 once more or in the shell 22. In the second case, the oil 21 may form a kind of minimal oil sump at the bottom of the shell, yet because of the movement of the rotating component of the transmission 13 in the shell 22 it is taken up from the shell 22 and ultimately also ends up at some point in the oil collection tank 20 once again, from which it is delivered via the suction outlet 26 and passing through the following filtering or screening device 29 by the pump 36 to the pump branching point 44.

In the engine branch, the oil 21 goes at first to a branching point 46, from which a portion of the oil 21 is supplied to the delivery lance 33 to form the rotor internal cooling and the rest of the oil 21 is supplied to the spray rings 32. In both cases, the oil 21 ultimately arrives as an oil mist in the interior space of the engine housing section 5, where it finally settles by force of gravity at the suction outlets 24, 25 and from here it is taken by the pump 36, each time passing through the filtering and screening device 29 following the suction outlets 24, 25, back to the pump branching point 44.

Figure 2:
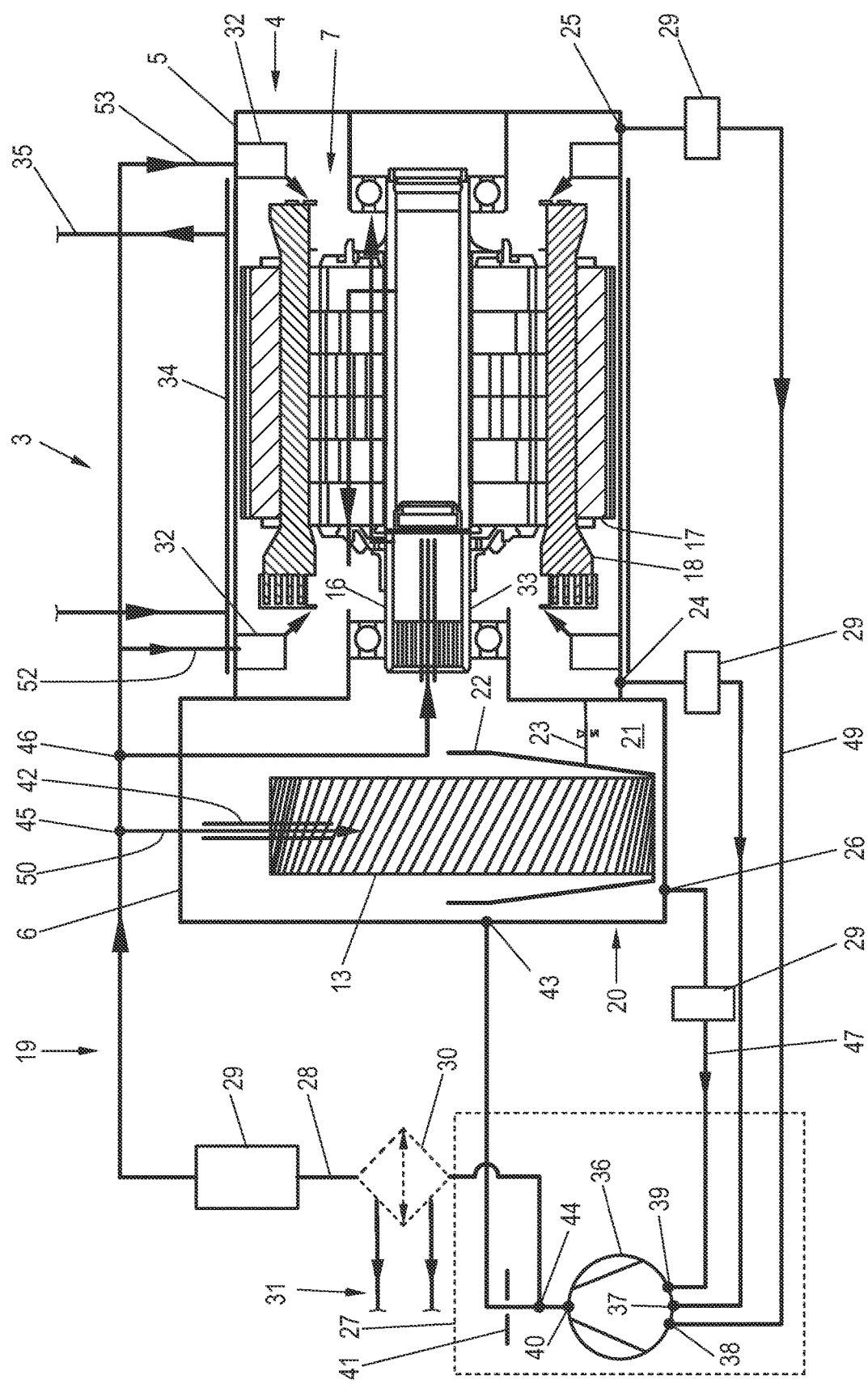
FIG. 2 shows the motor of the motor vehicle of FIG. 1.

With reference to FIG. 2, remarks shall be made as to the delivery volumes which can be generated by the pump 36 or the achievable volume flows. Thus, different delivery volumes can be generated by the pump 36 at the suction inlets 37-39 or in regard to the pump stages of the pump 36. Specifically, the delivery volumes at the suction inlets 37, 38 associated with the suction outlets 24, 25 of the engine housing 5 are equal in size and larger than the delivery volume at the suction inlet 36 associated with the suction outlet 26 of the oil collection tank 20. Consequently, the oil 21 can be delivered from the engine housing 5 to the pump 36 and from the oil collection tank 20 to the delivery device 5 with different pump performance.

The volume flows occurring in the oil lines depend on the one hand, on the particular pump performance, and on the other hand on the circumstances involving the delivery pathway. In general, the volume flow is greater as the corresponding pump performance is larger and the less the flow resistance acting on the oil 21 along the delivery pathway. The flow resistance depends on the qualities of the oil lines, such as the diameter and the internal roughness and so forth. In addition, the resistance can be changed by introducing throttle devices, such as continuously adjustable ones. Against this background, in the motor 2 that the pump 36 and the components of the oil circuit 19, namely the throttle device not otherwise shown in FIG. 2 and the oil lines, are adapted and designed such that the volume flow of the oil 21 delivered from the engine housing 5 to the pump 36 is greater than the volume flow of the oil delivered from the pump 36 to the engine housing 5. Hence, a larger volume of oil 21 can be supplied by the pump 36 to the engine housing 5 than the oil which can be drained from it. In this way, the formation of an oil sump in the engine housing 5 is avoided.

Merely as an example, the maximum oil volume flow 20 which can be supplied to the engine housing 5 may be a liter per minute and the maximum oil volume flow which can be drained may be 22 liter per minute. In detail, an oil volume flow of 3 liters per minute may be delivered by an oil line 47 connecting the suction outlet 26 of the oil collection tank 20 to the suction inlet 39 of the pump 36. For example, an oil volume flow of 11 liters per minute can be delivered respectively by an oil line 48, 49 connecting one of the suction outlets 24, 25 of the engine housing 5 to one of the suction inlets 37, 38. An oil volume flow of 5 liters per minute can be delivered by an oil line 50 connecting the branching point 45 to the spray nozzle 42, which likewise holds for an oil line 51 connecting the branching point 46 to the delivery lance 33. After the branching point 46, the oil flow divides further into two oil lines 52, 53, leading respectively to one of the spray rings 32, and an oil volume flow of 7.5 liters per minute can be delivered by each of these oil lines 52, 53. In total, there results therefore a maximum delivery performance of the pump 36 of 25 liters per minute, which is taken up and also drained off accordingly at the pressure side. Insofar as a smaller total oil volume flow is delivered on account of current operating conditions, the figures for the oil volume flows indicate the ratio of the volume flows in the respective oil lines 47-53.

As has been explained in some embodiments shown for the motor 2, a difference arises between the volume flow of the oil 21 delivered from the engine housing 5 to the delivery device 27 and the volume flow of the oil 21 delivered from the delivery device 27 to the engine housing 5 of 2 liters per minute. This difference can be compensated in that a volume flow of the oil 21 corresponding to this difference is supplied to the oil collection tank 20 in the corresponding operating mode. The oil volume not currently in circulation, i.e., the portion of the oil 21 not cooling or lubricating either the electric machine 7 or the transmission 13 and not flowing in one of the oil lines of the oil circuit 19 or located in the delivery device 27, therefore collects in the embodiment shown in the transmission housing section 6 or in another container, which alternatively or in addition to the transmission housing section 6 serves as an oil collector.

Figure 3:
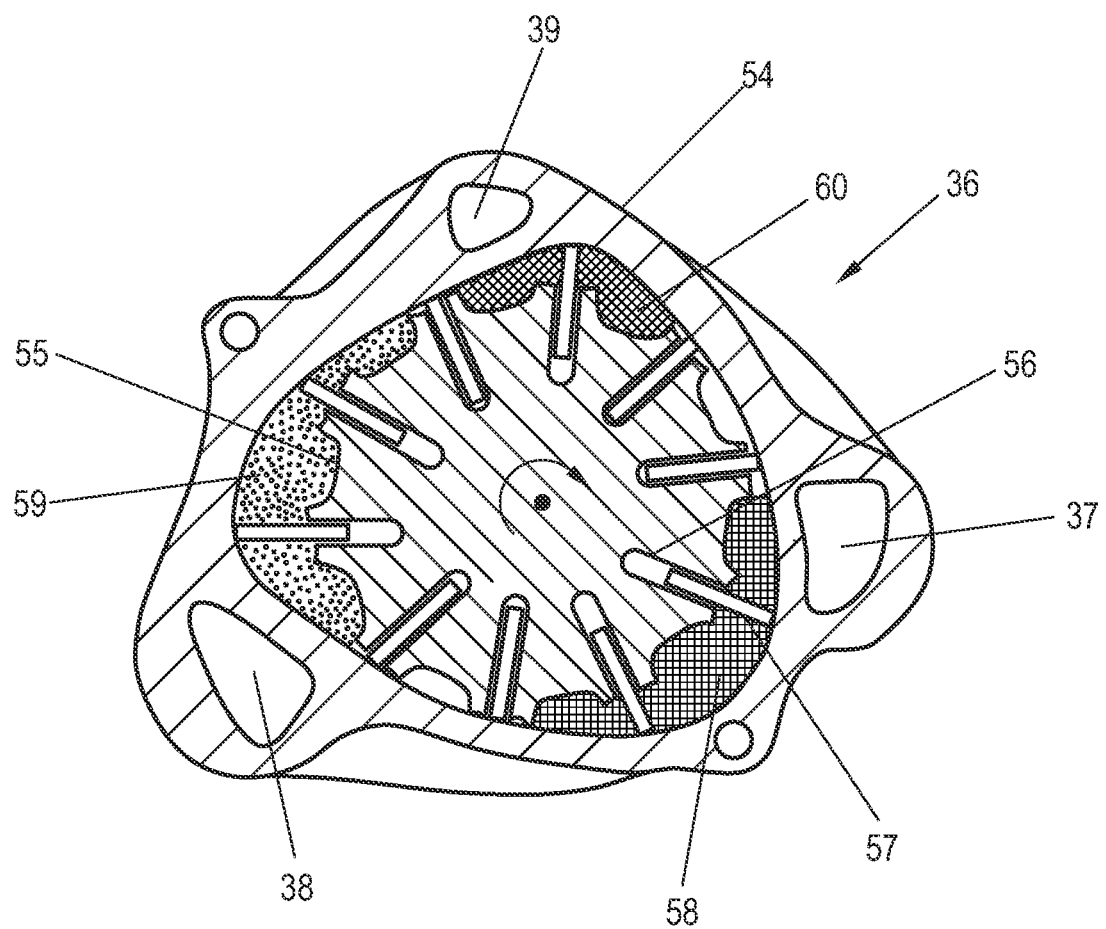
FIG. 3 shows a sectional view of a pump of a delivery device of the motor of FIG. 2.

Details in regard to the pump 36 are described next. FIG. 3 shows a cross section through the pump 36, which is a three-stroke vane pump. The pump 36 comprises a hollow cylinder or stator 54 with a non-circular interior space. In this space is arranged a rotor 55, having radially extending guide slots 56, in which are received or arranged rotary vanes 57 which can move longitudinally in the radial direction, and which move during the rotation of the rotor 55 outward up to the interior wall of the stator 54 or its interior space, by virtue of centrifugal force. Thanks to the triangular-oval shape of the interior space, two delivery volumes 58-60 are formed, in which the oil 21 can be delivered separately. Thus, the first delivery volume 58 (indicated by the horizontally tiled surface) is connected to the first suction inlet 37, the second delivery volume 59 (indicated by the dotted surface) is connected to the second suction inlet 38, and the third delivery volume 60 is connected to the third suction inlet 39, while the delivery volumes 58-60 emerge into the common outlet 40 at the pressure side, which is concealed in FIG. 3 by the rotor 55. The delivery volumes 58 and 59 are symmetrically formed, so that the same oil delivery performance is produced in regard to the suction inlets 37, 38. The delivery volume 60 is smaller than the delivery volumes 58 and 59, so that less oil delivery performance results in regard to the suction inlet 39.

Depending on the particular triangular-oval shape, the oil delivery performance at the suction inlets 37-39 can be designed as needed. In the case of more than three suction inlets of the pump 36, the interior space of the stator 42 may be polygonal-oval, in order to form further delivery volumes. If only two suction inlets of the pump 36 need to be provided, the interior space of the stator 42 can then be oval or elliptical.

German patent application no. 10 2022 109969.5, filed Apr. 26, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:
1. A motor for a motor vehicle, comprising:
an engine housing to contain an electric machine, wherein the electric machine and an oil collection tank of the motor or the motor vehicle are incorporated in an oil circuit, wherein oil for the cooling and/or lubricating of the electric machine circulates in the oil circuit by at least one delivery device,
wherein the delivery device comprises a pump having at least two suction inlets, at least one such inlet being connected to at least one suction outlet of the engine housing and at least one other inlet is connected to at least one suction outlet of the oil collection tank, and the oil can be delivered by a common outlet of the pump at the pressure side to the oil collection tank and to the electric machine.

2. The motor according to claim 1, wherein the pump comprises at least three suction inlets, at least two of which are connected to at least two suction outlets of the engine housing, which are situated at the bottom and on opposite sides of the engine housing.

3. The motor according to claim 1, wherein the pump is a vane pump.

4. The motor according to claim 3, wherein the vane pump is a two-stroke vane pump or a three-stroke vane pump.

5. The motor according to claim 1, wherein the pump is adapted to generating different delivery volumes through different suction inlets, so that the oil can be delivered from the engine housing to the delivery device and from the oil collection tank to the delivery device with different pump performance.

6. The motor according to claim 1, wherein the pump and at least one component of the oil circuit is adapted and/or designed such that the volume flow of the oil which can be delivered from the engine housing to the delivery device is greater than the volume flow of the oil which can be delivered from the delivery device to the engine housing.

7. The motor according to claim 6, wherein the pump and the component of the oil circuit are adapted and/or designed such that the difference between the volume flow of the oil delivered from the engine housing to the delivery device and the volume flow of the oil delivered from the delivery device to the engine housing can be compensated in that a volume flow of the oil corresponding to this difference can be supplied to the oil collection tank.

8. The motor according to claim 1, wherein an oil line leading away from the pump comprises a venting device for venting of air from the oil circuit.

9. The motor according to claim 1, wherein the motor configured as a gear motor comprises a housing, containing the engine housing as an engine housing section for the electric machine and a transmission housing section for a transmission coupled to the electric machine, wherein the transmission can be incorporated in the oil circuit for cooling and/or lubrication by the oil.

10. The motor according to claim 9, wherein the interior space of the engine housing section and the interior space of the transmission housing section are separated from each other such that the oil collects separately in the engine housing section and the transmission housing section at respectively at least one suction outlet coming from the pump.

11. The motor according to claim 10, wherein a lower portion of the transmission housing section in which the oil collects forms the oil collection tank.

12. The motor according to claim 11, wherein the transmission or at least one component of the transmission is accommodated at least partly inside at least one shell which is open at the top on one side, so that the oil collection tank is bounded by an interior wall of the transmission housing section and the shell and is open at the top, emerging into the rest of the interior space of the transmission housing section.

13. The motor according to claim 1, wherein the oil can be brought by at least one spray ring into the interior space of the engine housing section and/or by a delivery lance into a rotor shaft of the electric machine to produce a rotor internal cooling.

14. The motor according to claim 1, wherein a heat exchanger is incorporated in the cooling circuit for control of the temperature of the oil and/or the engine housing section comprises a cooling water jacket, which can be incorporated in a cooling water circuit.

15. A motor vehicle, comprising:
a motor according to claim 1.

* * * * *